Feb. 12, 1935.                  D. C. HODGKIN                  1,990,825
                              ADVERTISING DISPLAY
                         Filed May 24, 1932          4 Sheets-Sheet 1
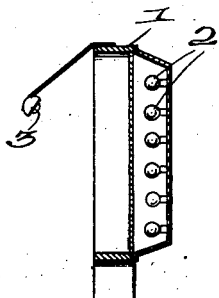
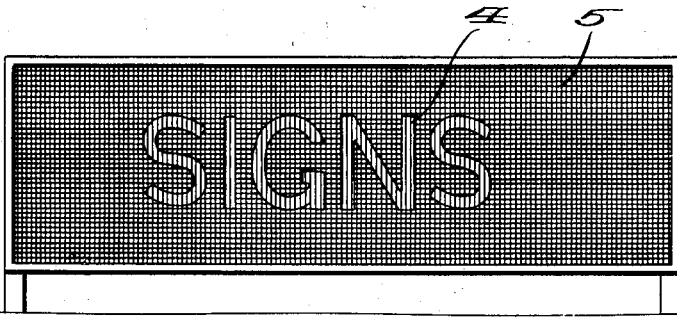
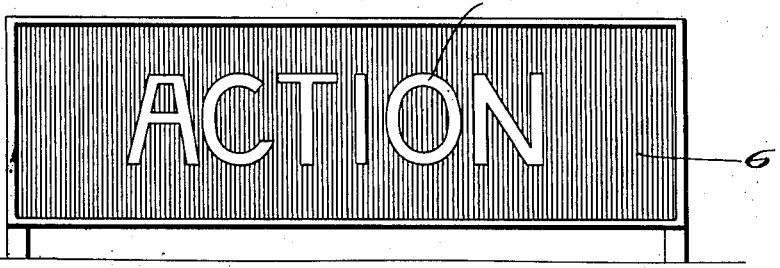
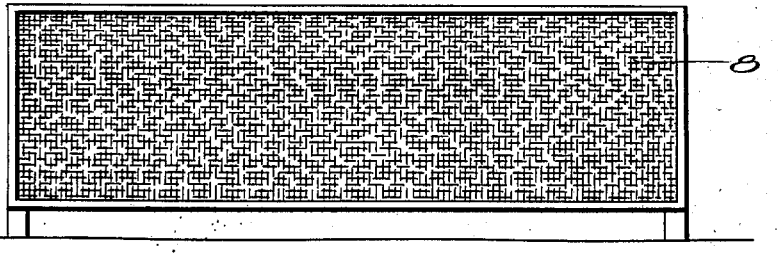
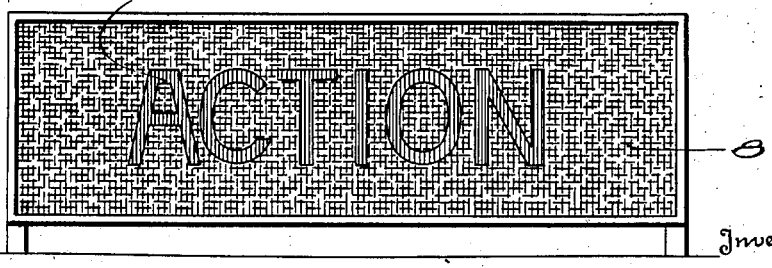

Feb. 12, 1935. D. C. HODGKIN 1,990,825
ADVERTISING DISPLAY
Filed May 24, 1932 4 Sheets-Sheet 2
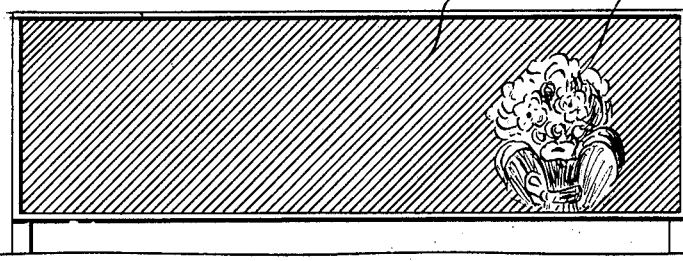
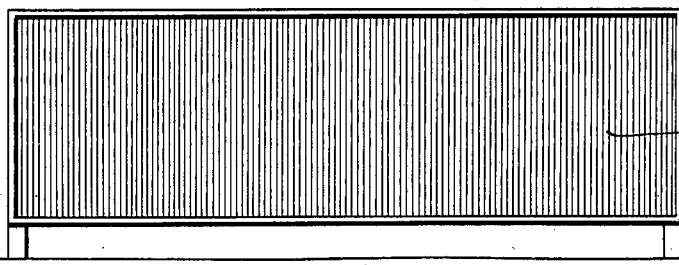
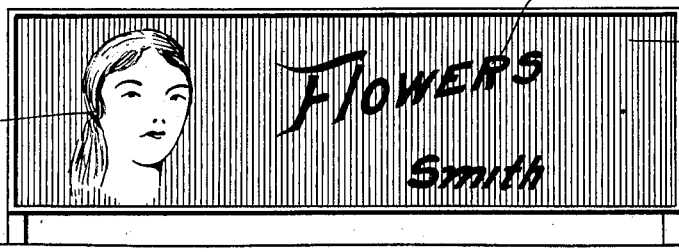
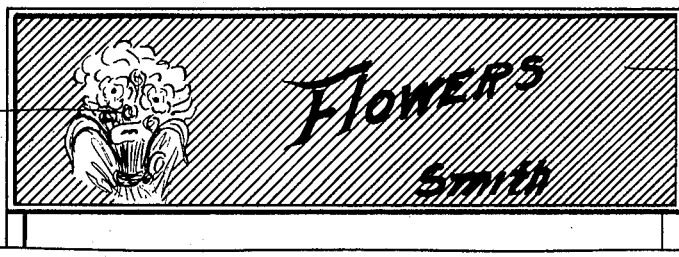

Feb. 12, 1935.  D. C. HODGKIN  1,990,825
ADVERTISING DISPLAY
Filed May 24, 1932  4 Sheets-Sheet 3

Inventor
Dustin C. Hodgkin
By Vernon E. Hodges
his Attorney

Feb. 12, 1935.   D. C. HODGKIN   1,990,825
ADVERTISING DISPLAY
Filed May 24, 1932   4 Sheets-Sheet 4

Patented Feb. 12, 1935

1,990,825

UNITED STATES PATENT OFFICE 1,990,825

ADVERTISING DISPLAY

Durbin C. Hodgkin, Detroit, Mich., assignor of one-fourth to Tom B. Owens, Fort Worth, Tex.

Application May 24, 1932, Serial No. 613,284

17 Claims. (Cl. 40—132)

This invention relates to an improvement in advertising signs of the character embodied in my former applications, Serial Nos. 310,581 and 310,582, filed October 5, 1928, now Patents Nos. 1,881,417 and 1,880,202, granted October 4, 1932.

In said applications I described methods of making an object or the like disappear totally or partially when subjected to the rays of transmitted white light, such as an ordinary electric lamp. However, in the methods there employed, the fade-out or disappearance of the front picture was in connection with means applied to the back of a translucent or transparent surface and which caused the disappearance of the front picture when subjected to transmitted light. Those applications also described the depicting of the new object to be presented for view when subjected to transmitted light on the back and not only behind the front object but also back of the coating or illustration which caused a fade-out of the front picture.

I have now discovered that it is possible to create all of the changes of scenery and illusions of motion by painting the entire front picture, fade-out, coating or portion thereof, and the back picture on the front side of a display surface and the matter may be entirely free of any coating on the back side thereof.

These discoveries are decidedly advantageous in using certain materials such as glass, celluloid, paper, cloth or the like, as a display surface, in that no coating of any kind needs to be applied to the material to render the back picture invisible when viewed by reflected light. Another advantage in printing, lithographing, silk screening, and photography, is that they are quicker and the plates do not have to be reversed for printing the back picture. Artists will find this method easier in that the back pictures and lettering do not have to be painted backwards as was necesary when it was depicted behind the display surface. Another advantage is that no paint or ink or coloring material is necessary on the back making it easier in the use with paper or cloth to glue or paste or otherwise adhere the picture sheet to a solid surface such as glass or celluloid or the like, and it is sometimes difficult to get certain paints, inks, etc., to adhere to glue or paste.

Instead of painting all of the coatings on the front side of the display surfaces, it is frequently advantageous to paint the front picture and the fade-out coating on the front of the display surface and the back picture on the back of the display surface, or to paint the front and back picture on the front of the display surface and the fade-out coating on the back. Certain illustrations require different treatments and the artists, sign painters, or printers, may find it advisable to use various combinations to effect economies in production.

In the accompanying drawings,

Fig. 1 is a vertical sectional view through an outdoor advertising sign with which my invention may be used;

Figs. 2, 3, 4 and 5 are front elevations of the sign illustrating successive coatings on the front surface thereof;

Fig. 6 is a rear elevation of the display surface showing the back coating thereof;

Figs. 7 and 8 are front elevations showing successive coatings on the front;

Fig. 9 is a similar view from the front showing the sign when subjected to transmitted light;

Figure 10:
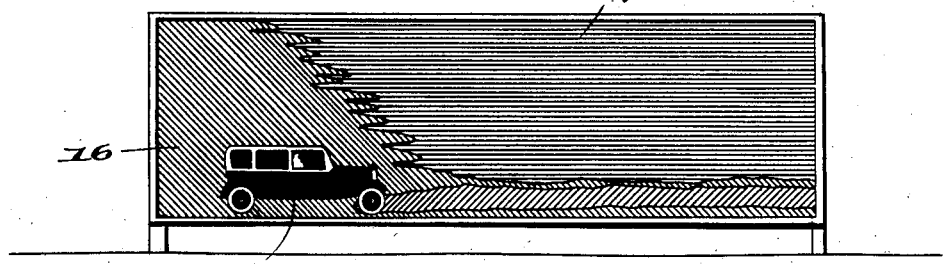
Figs. 10 and 11 are front elevations of the front surface showing successive coatings thereon.

I have shown the drawings lined to represent the colors used as illustrations for the principles of my invention, although various other colors will be found suitable, and as explained in my former applications, the invention is not limited to the painting of signs but it may be applied equally well to any of the well-known methods of depicting illustrations, signs or advertising matter on a surface, such as painting, lithographing, photography, silk screening or the like.

I have illustrated my invention in connection with an ordinary bill board or poster board, or the like, as a means of supporting the display surface and which is represented in Fig. 1 as built out from the top, bottom, and ends forming a casing 1, within which the display surface is adapted to be supported in position for illumination by lamps 2, at the back and 3 at the front, which are connected with a suitable flashing switch, well-known in the art for alternately causing an illumination of these lamps, in order to subject the display surface alternately to transmitted and reflected light from the rear and front respectively. The display surface which is in the form of a sheet may be of translucent or transparent material, such as glass, celluloid, or even paper or cloth, as may be suitable for the purpose.

In Fig. 2 is represented the first coating on the front side of the display surface which is shown as comprising the word "Signs" designated by the numeral 4, and which is shown as painted in red and surrounded by a black background 5. Over the first coating thus depicted, I provide a second coating 6, which is red throughout, with the exception of blank spaces therein forming the word "Action" represented by the numeral 7. Over this second coating I provide a third coating 8, which is shown as yellow, covering the entire first two coatings including the word "Action." As shown in Fig. 5, I then paint the word "Action" in red directly over the yellow coating 8, and directly in front of the blank spaces 7, forming the word "Action", as shown at 9 in Fig. 3. The sign is now complete and when subjected to reflected light from the front, it lights as shown in Fig. 5, showing the word "Action" in red on the yellow background with nothing else visible. However when the back lights subject the sign to transmitted light, the word "Action" will disappear and the word "Sign" will appear in red with a brownish-black background. The red coating 6, applied over the original black background 5, will turn the black somewhat brownish in shade but when viewed from a distance it will have the appearance of black. The complementary coatings in red surrounding the word "Action" and forming the word "Action" in Figs. 3 and 5, respectively, will cause a disappearance of the word "Action" when subjected to transmitted light. In this arrangement, all of the coatings are painted on the front surface of the display sheet.

In Figs. 6 to 9, I have represented a method of painting the front and back pictures on the front of the display surface and the fade-out coating on the back. Fig. 9 represents the first coating applied to the front of the display surface in which a bouquet of flowers designated 10 and represented in natural colors is surrounded by a purple background 11. Over this I cover it with a complete coating 12 in red which constitutes the second coating on the front and covers the entire surface. Over this red coating I depict a bride's face, veil, etc., represented by the numeral 13, which are painted in natural tints directly over the flowers 10, the eyes and mouth being painted over the centers of predetermined flowers and the flower behind the mouth being red so as to merge with the lips. If desired, suitable advertising matter 14, may also be applied to one or both of the backgrounds 11 and 12. Under the rays of transmitted light, the tints of the bride's face, eyes, and lips will be absorbed or disappear into the flowers, but where the white and pale blue and grey shadows of her veil have been painted, the flowers will show slightly darker. The flowers 10 should be drawn and painted in a predetermined manner, so as to merge with the corresponding portions of the bride's face and veil.

As shown in Fig. 6, the reverse or back side of the display surface has that portion of the flowers not covered by the face painted in pale blues and whites to correspond with her veil on the front. Under the rays of transmitted light, the bride's veil and face will disappear and the flowers appear. The red coating shown in Fig. 7 is simply to render that portion of the bouquet extending beyond the face and veil invisible when viewed by reflected light and to provide a contrasting background. Under alternate flashing of the lights to subject the display surface to transmitted and reflected lights, the pictures of the bride and flowers will alternately appear.

Figure 11:
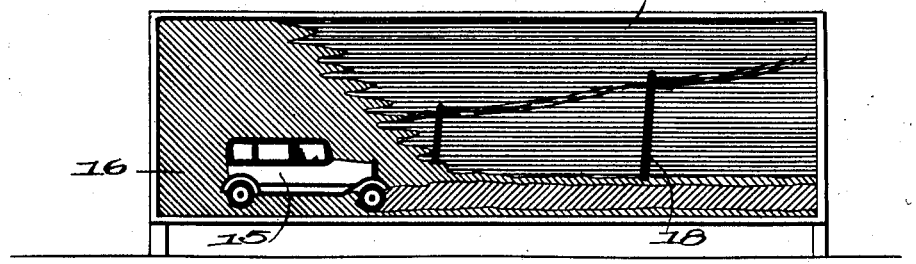

In Figs. 10 to 13, I have represented the method of painting the front picture and the fade-out on the front of the display surface and the back picture on the back thereof. In Fig. 10, I show an automobile 15, designed to be painted in blue with yellow stripes forming the lines and wheels thereof. The background of the automobile is represented in green, as shown at 16, and I have shown a blue sky at 17. This is the first coating on the front of the display surface. In Fig. 11 is represented the second coating on the front wherein I have painted the car 15 in yellow with blue lines and wheels complementary to the colors in Fig. 10. The background 16 remains green as in Fig. 10, and the sky 17 blue, but I show telephone poles 18, and wires in grey-black which are painted over the blue sky 17.

This forms the second partial coating on the front. When subjected to transmitted light, the blue and yellow of the car shown in Figs. 10 and 11 will merge and disappear into the green background. When subjected to reflected light, the picture will appear as shown in Fig. 11.

Figure 12:
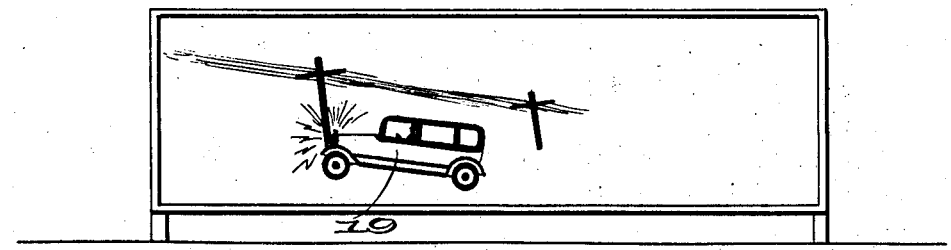
Fig. 12 is a similar view of the back coating.
Figure 13:
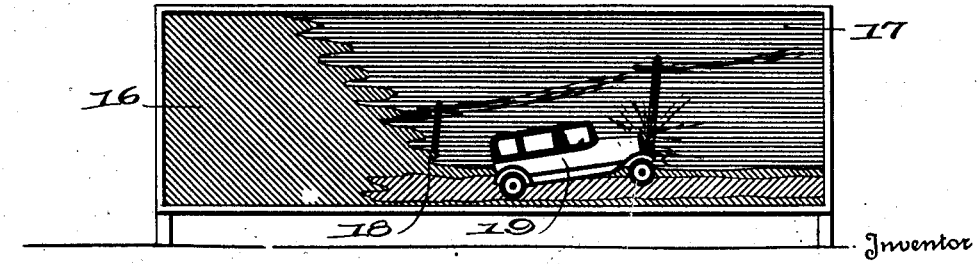
Fig. 13 is a view from the front showing the fade-out of the front picture and the illumination of the back picture caused by transmitted light.

In Fig. 12, I show the back of the display surface having a similar car represented 19, painted in yellow with blue stripes smashed against a pole in the telephone line. If necessary, the surrounding background may be darkened on the back to enhance the brillance of the yellow car. When the picture thus painted is subjected to transmitted light, the car on the front disappears as above described, and the back car 19 appears in a position smashed against a pole as represented in Fig. 13. Under alternate flashing of the lights, the display will show a car in the positions represented in Figs. 11 and 13, but the optical illusion will create a movement of the car across the intervening space in a very realistic fashion.

In the foregoing, I do not confine myself to the methods of fade-out or disappearance described, but may use any of those described herein or those described in my former applications, either individually or in association with each other but my present method utilizes the depicting on the front of the display surface of the front picture and the back picture or the fade-out for creating changes of scenery or action or presenting of different views but may be used for various purposes, not being confined to advertising or to signs, because it may be used to enhance the beauty of lamp shades and portraits or paintings. For instance, it is possible to have a photograph or portrait of father represented on the front of the display surface which will be viewed by reflected light and which will completely disappear and a picture of mother appear when viewed by transmitted light.

Figure 14:
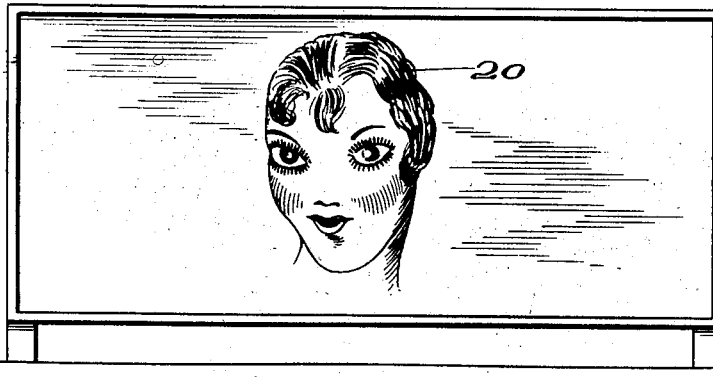
Figs. 14 and 15 are front elevations of the display surface showing successive coatings thereon for causing a change in position.
Figure 15:
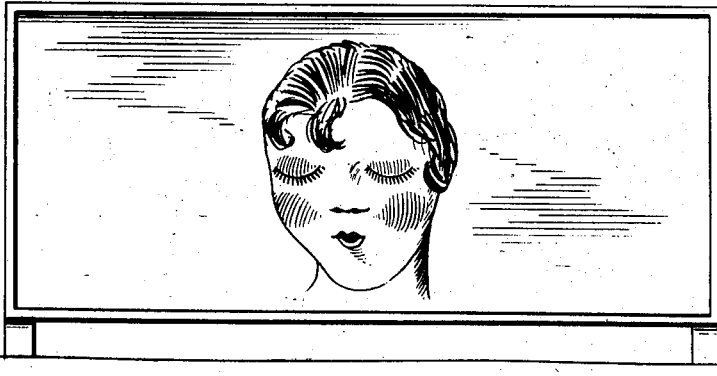

In Figs. 14 and 15, I have shown the method of painting on the front and causing an illusion of motion or action where no fade-out is required. In Fig. 14, I show the picture of a woman designated 20, with her eyes open and smiling and with deep shadows between the lids.

This is the first coating on the front of the display surface. In Fig. 15, I paint the eyes closed over the open ones by using whites and purples and blues for the shadows on the lids and painting the lips closed and directly over the dark shadows therein in Fig. 14, so that when the picture is subjected to reflected light it will appear as shown in Fig. 15, which shows the second coating on the front surface but under the alternate flashing of transmitted and reflected light, the alternate pictures shown in Figs. 14 and 15 will appear with an illusion of an opening and closing of the eyes and a variation in the shape of the mouth as to represent a smile in a life-like fashion.

These pictures might be reversed if desired, so that the front picture would have the eyes closed but if reversed it would be desirable to use one of a method of a fade-out, as described above, or in my former applications.

In the foregoing, I do not confine myself to any particular colors, because any combination may be utilized, even black and white, and the colors mentioned are merely for purposes of illustration but only transparent colors should be used for the best results. The reference to painting of the pictures or objects is also for purposes of illustration and I may use any of the methods of transfer or illustration, such as printing, lithographing, photography, silk screening, decalcomania, etc.

My invention is not confined to use with an illuminated sign or display case, because the methods described may be used in depicting illustrations on transparent or translucent surfaces for alternate view when holding the same under an ordinary light and then held up in front of the light, so as to view the display surface alternately under reflected and transmitted light to create the change in view, as described above. It may be possible to represent two pictures of a fade-out on either side of a display surface to utilize both sides thereof in which case a sheet of translucent material, such as tissue paper, should be applied to the back side of the surface showing the illustrations or fade-out to be invisible under reflected light but visible under transmitted light.

It may be desirable to have the front side of the display surface entirely clear of ink or paint or the like, such as the glass or celluloid used for counter or window displays. Paint and ink becomes easily scratched on such surfaces and to obviate such conditions, I have discovered that the entire front or reflected light picture, fade-out, and back picture, may be painted on the back side of the surface, leaving only the glass or celluloid on the front as a protecting surface. This gives the best results only with transparent surfaces, and not with cloth or paper, because they are only translucent.

I claim:

1. A method of making display matter comprising arranging illustrations on one side of a display surface in superposed relation in position to be alternately viewed by transmitted and reflected light, and so arranging coloring matter as to cause a disappearance of at least a part of one of the illustrations when subjected to transmitted light.

2. A method of making display matter comprising arranging a plurality of illustrations on the front side of a display surface in superposed relation in position to be alternately viewed by transmitted and reflected light, and so arranging coloring matter relative to the reflected light illustration as to cause a disappearance of at least a part thereof when subjected to transmitted light.

3. A method of making display matter comprising arranging an illustration on a side of a display surface to be viewed by transmitted light, and arranging a second illustration on the same side of the display surface in front of said first illustration to be viewed by reflected light, and so arranging the coloring matter as to cause a disappearance of at least a part of the second illustration when subjected to transmitted light.

4. A method of making display matter comprising illustrating an object on the front side of a display surface to be viewed by transmitted light, superimposing an illustration of a second object over said first object on the same side of the display surface and in front of said first object to be viewed by reflected light, and arranging coloring matter behind said second object in a position to cause a disappearance theerof when subjected to transmitted light.

5. A method of making display matter comprising arranging an illustration on a side of a display surface, arranging coloring matter in front of said illustration on the same side of the display surface, and arranging a second illustration in front of the coloring matter on the same side of the display surface, to be viewed by reflected light, the coloring matter being arranged in position with respect to the second illustration to cause a disappearance of at least a part thereof when subjected to transmitted light.

6. A method of making display matter comprising arranging coloring matter on one side of a display surface, and arranging an illustration in front of said coloring matter on the same side of the display surface to be viewed by reflected light, said coloring matter being arranged with respect to the illustration to cause a disappearance of at least a part thereof when subjected to transmitted light.

7. A method of making display matter comprising arranging coloring matter on one side of a display surface, arranging an illustration in front of said coloring matter on the same side of the display surface to be viewed by reflected light, said coloring matter being arranged with respect to the illustration to cause a disappearance of at least a part thereof when subjected to transmitted light, and arranging an illustration at the back of said display surface to be viewed by transmitted light.

8. A method of making display matter comprising illustrating an object on one side of a display surface to be viewed by transmitted light, applying a second illustration over said first object on the same side of the display surface to be viewed by reflected light, and arranging coloring matter on the opposite side of the display surface in position to cause a disappearance of the second illustration when subjected to transmitted light.

9. A method of making display matter comprising applying at least three coatings to a display surface, at least two of said coatings forming illustrations to be viewed alternately by transmitted and reflected light and another of said three coatings forming a fadeout for at least a part of the reflected light illustration, at least two of said three coatings being applied in superimposed relation on the front side of said display surface, one of said front coatings forming the reflected light illustration.

10. A method of making display matter comprising applying at least three coatings to a display surface, at least two of said coatings forming illustrations to be viewed alternately by transmitted and reflected light and another of said three coatings forming a fadeout for at least a part of the reflected light illustration, at least two of said three coatings being applied in superimposed relation on the front side of said display surface, one of said front coatings forming the reflected light illustration, and the third of said three coatings being applied on the back side of said display surface.

11. A method of making display matter comprising illustrating an object on a side of a display surface to be viewed by transmitted light, and superimposing a second illustration in a changed position in front of the first and on the same side of the display surface to be viewed by reflected light, and so arranging coloring matter as to cause a disappearance of at least a part of the second illustration when subjected to transmitted light.

12. An advertising display comprising a display surface having a plurality of illustrations arranged on the same side thereof in super-imposed relation in position to be alternately viewed by transmitted and reflected light, and means arranged relative to the reflected light illustration for causing a disappearance of at least a part thereof when subjected to transmitted light.

13. An advertising display comprising a display surface having an illustration on a side thereof to be viewed by transmitted light, and having a second illustration arranged in front of the first on the same side of the display surface in position to be viewed by reflected light, and means arranged relative to the reflected light illustration for causing a disappearance of at least a part thereof when subjected to transmitted light.

14. An advertising display comprising a display surface having an illustration thereon in position to be viewed by reflected light, and coloring matter arranged behind said illustration on the same side of said display surface in position to cause a disappearance of at least a part of said illustration when subjected to transmitted light.

15. An advertising display comprising a display surface having an illustration thereon in position to be viewed by reflected light, coloring matter arranged behind said illustration on the same side of said display surface in position to cause a disappearance of said illustration when subjected to transmitted light, and a second illustration arranged behind the said coloring matter to be viewed by transmitted light.

16. An advertising display comprising a display surface having an illustration depicted thereon to be viewed by transmitted light, a second illustration depicted on the same side of the display surface in front of the first-mentioned illustration to be viewed by reflected light, and means arranged behind said second illustration for causing a disappearance of at least a part thereof when subjected to transmitted light.

17. An advertising display comprising a display surface having an illustration depicted on a side thereof to be viewed by reflected light, coloring matter arranged behind said illustration on the same side of the display surface in position to cause a disappearance of said illustration when viewed by transmitted light, and a second illustration depicted on the opposite side of said display surface to be viewed by transmitted light.

DURBIN C. HODGKIN.